(12) United States Patent
Doetsch et al.

(10) Patent No.: US 7,583,638 B2
(45) Date of Patent: Sep. 1, 2009

(54) DEVICE AND METHOD FOR PROCESSING A DIGITAL DATA SIGNAL IN A CDMA RADIO TRANSMITTER

(75) Inventors: Markus Doetsch, Schliern (CH); Tideya Kella, München (DE); Peter Jung, Otterberg (DE); Jörg Plechinger, München (DE); Peter Schmidt, Erpolzheim (DE); Michael Schneider, München (DE)

(73) Assignee: Infineon Technologies AG, Munich (DE)

( * ) Notice: Subject to any disclaimer, the term of this patent is extended or adjusted under 35 U.S.C. 154(b) by 1607 days.

(21) Appl. No.: 10/117,806

(22) Filed: Apr. 8, 2002

(65) Prior Publication Data

US 2002/0131385 A1  Sep. 19, 2002

Related U.S. Application Data

(63) Continuation of application No. PCT/DE00/03467, filed on Sep. 28, 2000.

(30) Foreign Application Priority Data

Oct. 6, 1999  (DE)  ................. 199 48 370

(51) Int. Cl.
*H04B 7/216*  (2006.01)
(52) U.S. Cl. .............. 370/335; 370/320; 370/341; 370/342; 375/140; 375/146; 375/222; 375/304
(58) Field of Classification Search .......... 370/320, 370/335, 341, 342; 375/140, 146, 304, 222
See application file for complete search history.

(56) References Cited

U.S. PATENT DOCUMENTS 4,630,283 A * 12/1986 Schiff ................... 375/143

| | | | |
|---|---|---|---|
| 4,930,141 A | 5/1990 | Ohmagari | |
| 5,418,803 A * | 5/1995 | Zhiglinsky et al. | 372/23 |
| 5,610,939 A * | 3/1997 | Takahashi et al. | 375/150 |
| 5,666,352 A | 9/1997 | Ohgoshi et al. | |

(Continued)

FOREIGN PATENT DOCUMENTS

CN  1058830 C  11/2000

(Continued)

OTHER PUBLICATIONS

Tietze, U. et al.: "Halbleiter-Schaltungstechnik" [Semiconductor Circuit Engineering], Springer Publishing House, 1990, No. 3-540-19475-4, vol. 10, pp. 795-798.

(Continued)

*Primary Examiner*—William Trost, IV
*Assistant Examiner*—Toan D Nguyen
(74) *Attorney, Agent, or Firm*—Laurence A. Greenberg; Werner H. Stemer; Ralph E. Locher

(57) ABSTRACT

A device for processing a digital data signal in a CDMA radio transmitter includes a channelization device, a spectral shaping device and a frequency correction device. The channelization device adds a channel-individual CDMA code to the digital data signal, the spectral shaping device subjects the digital, channel-individualized data signal to a spectral shaping and the frequency correction device performs a spectral shift of the digital, spectrally shaped data signal.

14 Claims, 5 Drawing Sheets

U.S. PATENT DOCUMENTS

| | | | |
|---|---|---|---|
| 5,748,623 A | 5/1998 | Sawahashu et al. | |
| 5,764,689 A * | 6/1998 | Walley | 375/147 |
| 5,848,107 A * | 12/1998 | Philips | 375/342 |
| 5,872,810 A | 2/1999 | Philips et al. | |
| 6,154,158 A * | 11/2000 | Walker | 341/118 |
| 6,198,730 B1 * | 3/2001 | Hogberg et al. | 370/320 |
| 6,208,844 B1 * | 3/2001 | Abdelgany | 455/82 |
| 6,272,168 B1 * | 8/2001 | Lomp et al. | 375/222 |
| 6,636,555 B1 * | 10/2003 | Frank et al. | 375/146 |
| 6,678,320 B1 * | 1/2004 | Aydin | 375/235 |
| 6,690,949 B1 * | 2/2004 | Shamlou et al. | 455/557 |
| 6,965,753 B1 * | 11/2005 | Miller et al. | 455/12.1 |

FOREIGN PATENT DOCUMENTS

| | | |
|---|---|---|
| DE | 197 08 626 C2 | 9/1998 |
| EP | 0 545 546 B1 | 6/1993 |
| EP | 0 693 830 A2 | 1/1996 |
| EP | 0 751 630 A2 | 1/1997 |
| EP | 0 809 364 A2 | 11/1997 |
| JP | 08-237169 | 9/1996 |
| JP | 11 340 950 A2 | 12/1999 |
| WO | WO 96/19883 | 6/1996 |
| WO | 97/37456 | 10/1997 |

OTHER PUBLICATIONS

Ovesjö, F.: "UTRA Physical Layer Expert Group", European Telecommunication Standard, Jun. 25, 1998, XP-002141421, pp. 1-41.

* cited by examiner

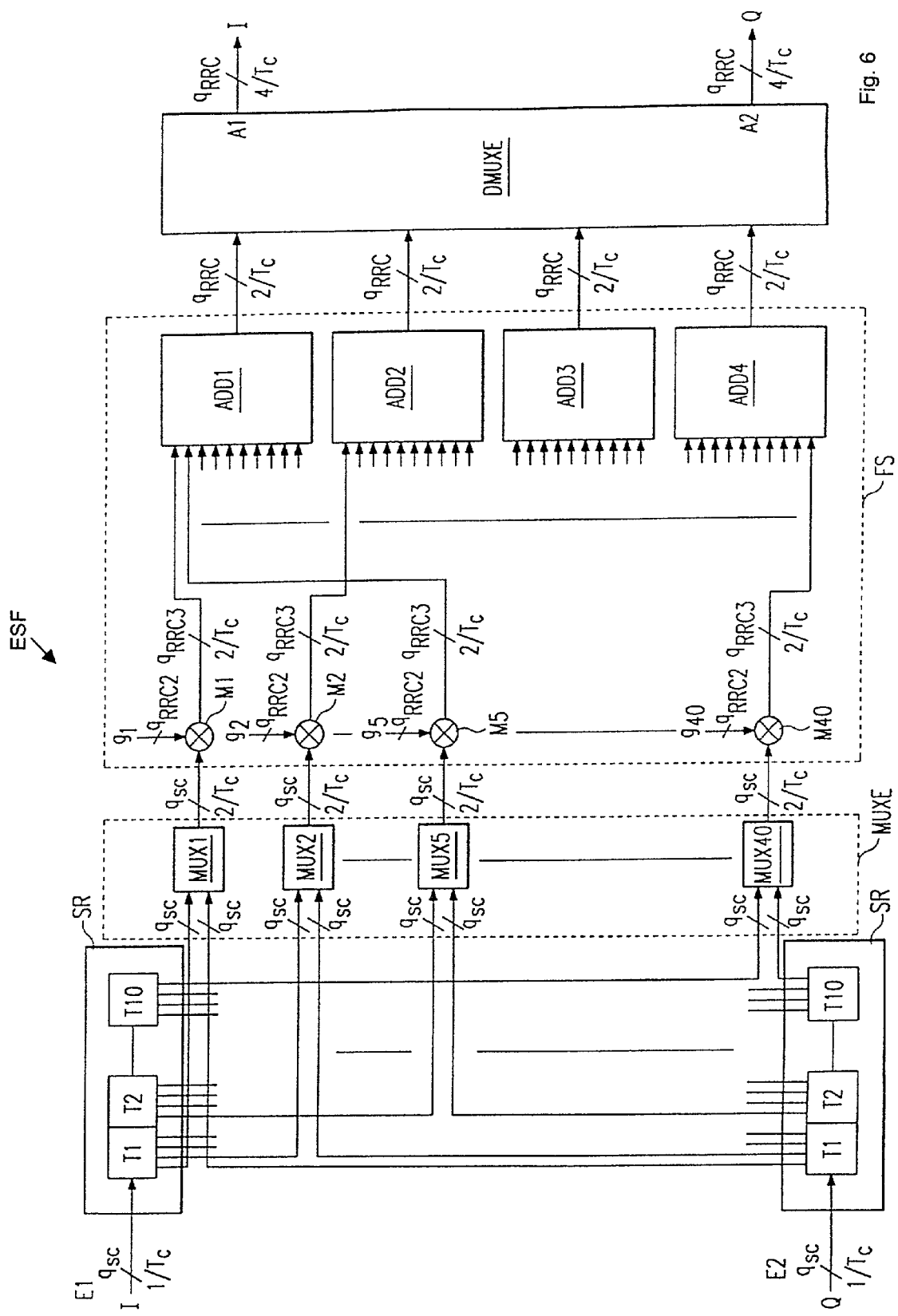

DEVICE AND METHOD FOR PROCESSING A DIGITAL DATA SIGNAL IN A CDMA RADIO TRANSMITTER

CROSS-REFERENCE TO RELATED APPLICATION

This application is a continuation of copending International Application No. PCT/DE00/03467, filed Sep. 28, 2000, which designated the United States.

BACKGROUND OF THE INVENTION

Field of the Invention

The invention relates to a device and a method for processing a digital data signal in a CDMA radio transmitter.

First-generation cellular mobile radio systems (for example, AMPS (advanced mobile phone service), NMP (Nordic mobile telephone), TACS (total access communication system), C-network) were able to transmit voice at a maximum data rate of 2 kbit/s and were in use until around 1992. Second-generation mobile radio systems (for example, the pan-European GSM (global system for mobile communications)) enable transmission of voice and data at a data rate of around 10 kbit/s. Work is currently being carried out worldwide on the development of radio transmitters/receivers for third-generation mobile radio systems, in particular UMTS (universal mobile telecommunication system). Since third-generation mobile radio systems are intended for the transmission of multimedia (i.e. voice/data/video) at a data rate of 2 Mbit/s, which represents a substantial increase compared with the second generation, a significant difficulty exists in developing transmitter and receiver systems which can handle a high data rate of this type with minimal power consumption (i.e. with a long battery life).

Third-generation mobile radio systems use the CDMA (code division multiple access) method. In CDMA, all subscribers use the same frequency range, but the radio signal is coded differently for or by each subscriber. Subscriber separation is enabled through the use of the different coding.

In mobile radio transmitters, it is already generally known to carry out a spectral shaping (filtering) of the signal which is to be transmitted and, if necessary, also a frequency correction of its mid-frequency. The purpose of these two measures is to adapt the transmit signal in terms of its bandwidth and frequency position to a required traffic channel. Both the filtering and the frequency correction are normally carried out on the analog transmit signal following digital-analog conversion of the transmit signal.

SUMMARY OF THE INVENTION

It is accordingly an object of the invention to provide a device and a method for processing a digital data signal in a CDMA radio transmitter which implements a particularly efficient and low-cost signal processing of a transmit signal and is therefore suitable for high data rates. In particular, the device and method are intended to be suitable for UMTS.

With the foregoing and other objects in view there is provided, in accordance with the invention, a device for processing a digital data signal in a CDMA radio transmitter, including:

a channelization device configured to impress a channel-individual CDMA code onto a digital data signal for providing a digital, channel-individualized data signal;

a spectral shaping device operatively connected to the channelization device, the spectral shaping device being configured to subject the digital, channel-individualized data signal to a spectral shaping for providing a digital, spectrally shaped data signal; and a frequency correction device operatively connected to the spectral shaping device, the frequency correction device being configured to spectrally shift the digital, spectrally shaped data signal.

The CDMA channelization (CDMA coding), spectral shaping and frequency correction are all carried out accordingly through the use of digital signal processing. Simulation calculations have shown that the most favourable implementation in terms of energy efficiency, hardware cost and maximum achievable data processing speed is achieved by the sequence according to the invention involving CDMA channel coding—spectral shaping—frequency correction.

In order to achieve high accuracy in the frequency correction, it is advantageous if the digital, spectrally shaped data signal which is output by the spectral shaping device has an M-fold higher data rate than the digital, channel-individualized data signal at the output of the channelization device. M is an integer, where $M \geq 2$.

According to a first preferred variant of the invention, the frequency correction device includes a multiplier, through the use of which a narrowband frequency correction sequence is multiplied onto the spectrally shaped data signal. In this case, the hardware cost incurred by the frequency correction device is minimized.

In a second variant for implementing the frequency correction device, the device includes an arithmetic unit which, through the use of a CORDIC algorithm, calculates a frequency-corrected, spectrally shaped data signal from the spectrally shaped data signal. This variant requires more hardware, but offers the advantage that the frequency correction can be carried out with essentially unlimited accuracy.

The invention offers a particular advantage in the case of CDMA codes with a variable spreading factor Q, which are also referred to as OVSF (orthogonal variable spreading factor) codes. Q can, for example, assume a value between 4 and 512.

A complex scrambling device can be provided to add a base station ID to the data signal. This is then preferably located in the signal path between the channelization device and the spectral shaping device.

If a weighting device, which multiplies each data symbol of the data string by a weighting factor, is provided in the signal path, this device is preferably located in the signal path upstream of the channelization device.

The aforementioned devices are preferably configured as logical switching elements, i.e. they contain no microcomputer or arithmetical processor. Maximum processing speed is thereby achieved.

With the objects of the invention in view there is also provided, a method for processing a digital data signal in a CDMA radio transmitter, the method includes the steps of:

impressing a channel-individual CDMA code onto a digital data signal for providing a digital, channel-individualized data signal;

spectrally shaping the digital, channel-individualized data signal for providing a digital, spectrally shaped data signal; and performing a frequency correction by spectrally shifting the digital, spectrally shaped data signal.

According to another mode of the invention, the step of performing a frequency correction includes performing a digital frequency correction at a clock rate which is Q×M times higher than a data symbol rate of the digital data signal, where Q is a spread factor of the CDMA code used and M is an integer where M≧2.

According to another mode of the invention, the step of performing a frequency correction includes performing a digital frequency correction by multiplying a narrowband frequency correction sequence onto the digital, spectrally shaped data signal.

According to another mode of the invention, the step of performing a frequency correction includes performing a digital frequency correction by running a CORDIC algorithm for calculating a frequency-corrected data signal from the digital, spectrally shaped data signal.

Other features which are considered as characteristic for the invention are set forth in the appended claims.

Although the invention is illustrated and described herein as embodied in a device and a method for processing a digital data signal in a CDMA radio transmitter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 is a circuit diagram of the spectral shaping device from FIG. 3.

DESCRIPTION OF THE PREFERRED EMBODIMENTS

Figure 1:
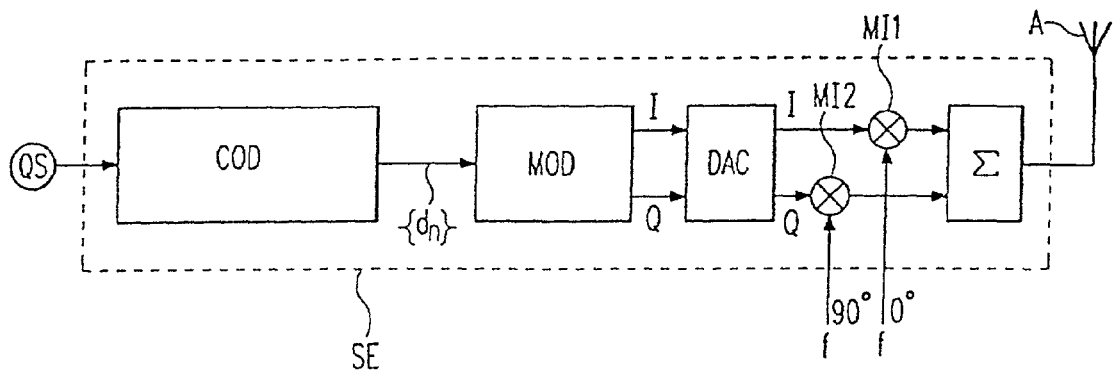
FIG. 1 is a block diagram of a radio transmitter for illustrating a signal processing in the radio transmitter.

Referring now to the figures of the drawings in detail and first, particularly, to FIG. 1 thereof, there is shown a fundamental structure, already known as such, of a transmit device SE of a radio transmitter, as used in a base station or mobile station of a mobile radio system.

The transmit device SE takes an analog source signal QS (for example, generated by a microphone) and feeds the latter to a coder COD. The coder COD includes an analog-digital converter (not shown) for digitizing the source signal QS and may furthermore contain a source coder, a channel coder, an interleaver and a block former, which, in a suitable manner, source-code, error-protection-code and interleave the digitized source signal QS and subdivide it into data blocks.

The coder COD outputs a binary data signal, which includes a data string $\{d_n\}$ of the data symbols $d_0, d_1, \ldots$. The data symbols $d_0, d_1, \ldots$ can, for example, be taken from the value stock $\{-1, 1\}$.

The data string $\{d_n\}$ is fed to a modulator device MOD which provides each data symbol with a subscriber-individual (or, more generally, specific to a logical channel) CDMA spread code and spectrally shapes (i.e. modulates) the data string for the transmission via a radio frequency carrier.

The modulator device MOD furthermore carries out a division of the data signal into an in-phase (I) branch and a quadrature (Q) branch. The I and Q signal components output by the modulator device MOD are fed to a digital-analog converter DAC, which generates corresponding analog I and Q signal components. The latter are in each case mixed in mixer stages MI1 and MI2 through the use of a radio frequency carrier with a frequency f with a 90° phase shift in relation to one another, are heterodyned and transmitted as a radio signal via an antenna A.

Figure 2:
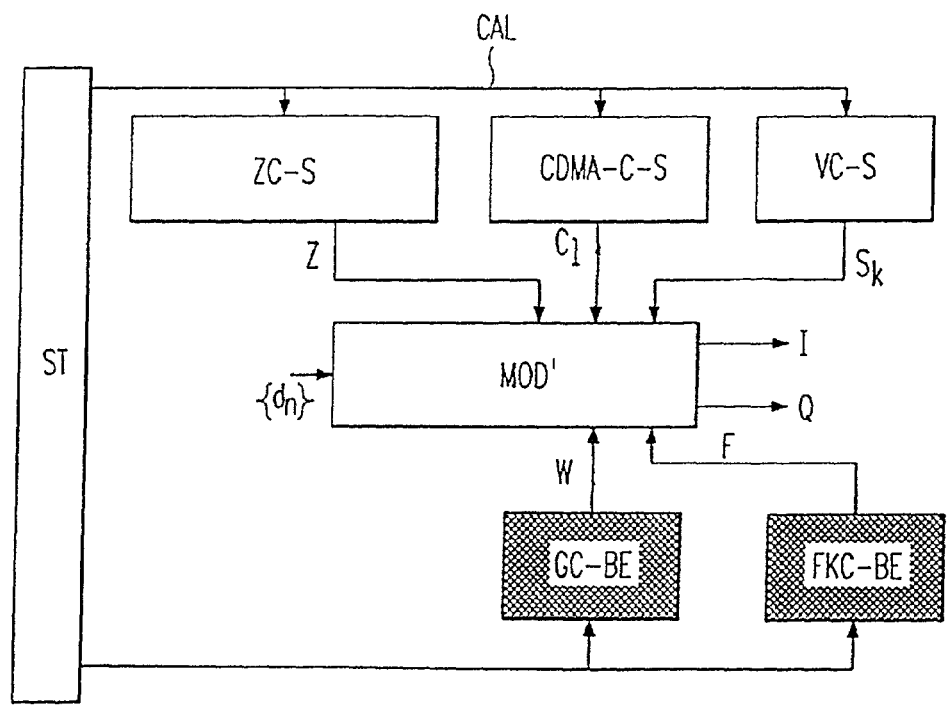
FIG. 2 is a block diagram of the modulator device shown in FIG. 1 according to the invention.

FIG. 2 explains the data processing operations implemented in the modulator device MOD. The processing operations represented by white blocks are directly hardware-implemented, whereas the processing operations in the blocks with the grey background are firmware-implemented.

A scrambling code memory VC-S, a CDMA code memory CDMA-C-S and an access code memory ZC-S are connected to a central modulator logic circuit MOD'. The scrambling code memory VC-S can store a plurality of scrambling codes $S_i$, the CDMA code memory CDMA-C-S can store a plurality of CDMA codes $C_i$, i=1, 2, ..., and the access code memory ZC-S can store an access code Z.

Each scrambling code $S_i$ is an identifier for a specific base station. If the transmit device SE is located in a base station, only one scrambling code S (i.e. the scrambling code allocated to this base station) is stored in VC-S.

As already mentioned, each CDMA code $C_i$ defines a logical channel. Different logical channels are mainly used for subscriber separation. A specific CDMA code is not permanently allocated to a specific subscriber (i.e. to a specific mobile station), but rather a suitable CDMA code is "negotiated" when a call is made between the base station and the mobile station. The CDMA code memory CDMA-C-S therefore always contains a plurality of CDMA codes $C_i$.

The access code Z is required only at the start of a call to signal a call request. It is not examined more closely below.

The memories VC-S, CDMA-C-S and ZC-S are connected via a code selection line CAL to a control device ST. By outputting code numbers k and 1, the control device ST defines the time and identity of the respective codes $S_k$ and $C_1$ which are intended to be used in the modulator logic circuit MOD'.

The modulator logic circuit MOD' is furthermore connected to a frequency correction code calculation unit FKC-BE and a weighting code calculation unit GC-BE. The FKC-BE and the GC-BE calculate continuously updated versions of a frequency correction code F or a weighting code W on the basis of temporally variable control signals which are provided by the control device ST. The current frequency correction codes F and weighting codes W are likewise fed to the modulator logic circuit MOD'.

As explained in detail below, a specific spectral shift in the digital transmit signal can be effected through the use of the frequency correction code F in order to compensate for unwanted frequency detuning between the receiver and the transmitter (for example, due to oscillator drifts, Doppler effects, etc.)

The weighting code W enables level adaptation of the transmitted signal, which will likewise be examined in detail below.

Figure 3:
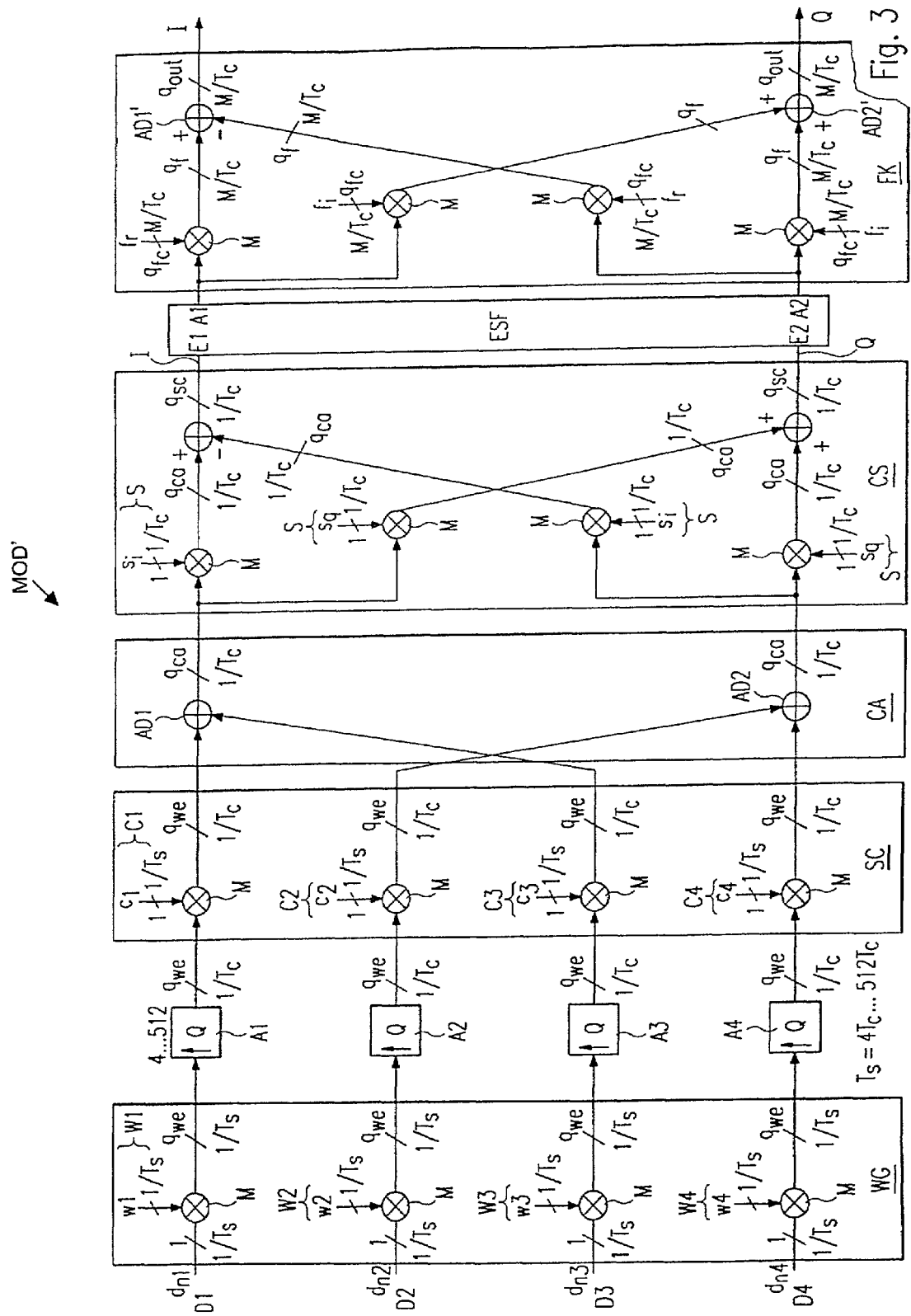
FIG. 3 is a block diagram of the modulator logic circuit of FIG. 2 for four data signals according to the invention.

FIG. 3 shows the structure of the modulator logic circuit MOD' in more detail. The modulator logic circuit MOD' differs from the modulator logic circuit MOD' shown in FIG. 2 only in that it has four data inputs D1, D2, D3 and D4 and is therefore suitable for simultaneously setting up four logical channels. Due to the identical channel structure, the two modulator logic circuits from FIG. 2 and 3 are designated with the same reference symbol MOD'.

The binary data strings $\{d_{n1}\}$, $\{d_{n2}\}$, $\{d_{n3}\}$ and $\{d_4\}$ are present at the data inputs D1, D2, D3 and D4 at the data symbol rate $1/T_s$. Here, $T_s$ designates the duration of the individual data symbols $d_{n1}$ (or $d_{n2}$, $d_{n3}$, $d_{n4}$). The individual data symbols $d_{n1}$, $d_{n2}$, $d_{n3}$, $d_{n4}$ can in turn be taken from the value stock $\{1, -1\}$.

The data symbols (word width 1) are weighted in an (optional) weighting unit WG by multiplying them by elements (weighting factors) w1, w2, w3 and w4 of the weighting codes W1, W2, W3 and W4 at the symbol rate. To do this, the weighting unit WG has four multipliers M, which multiply the data symbols $d_{n1}$ by the weighting factor w1, the data symbols $d_{n2}$ by the weighting factor w2, etc. Data signals available at the outputs of the weighting unit WG have a word width $q_{we}>1$. Their signal rate is unchanged at $1/T_s$.

The weighting factors w1, w2, w3, w4 can be regarded as "loudness factors". By using different weighting factors w1, w2, w3, w4 for each channel, different radio distances in relation to the different channels can be taken into account and/or, with the use of different spreading factors Q for each channel, the resulting different channel energies can be compensated.

The weighted data strings $\{d_{n1}\}$, $\{d_{n2}\}$, $\{d_{n3}\}$ and $\{d_{n4}\}$ are sampled by sampling stages A1, A2, A3, A4 with oversampling (oversampling factor Q). The signal rate is thereby increased in each signal path from $1/T_s$ to $1/T_c$, where $T_c$ designates the chip duration, which represents the time basis for the subsequent CDMA spread coding. The oversampling factor Q is therefore also designated as the spreading factor Q. It may be different for each channel and may be between 4 and 512, i.e. $T_s=4T_c \ldots 512T_c$.

In the case of a UMTS transmit device of the third mobile radio generation, the signal rate $1/T_c$ at the output of the sampling stages A1, A2, A3, A4 is $3.84 \times 10^6$ samplings per second.

The Q-fold oversampled data symbols $d_{n1}$, $d_{n2}$, $d_{n3}$, $d_{n4}$ are then spread-coded in the spread coder SC by adding a channel-specific, digital spread code sequence.

A first spread code sequence C1 including Q digital chips $c_1$ (word width 1) is multiplied through the use of a multiplier M onto each data symbol $d_{n1}$ supplied by the first input D1. A corresponding procedure is adopted in respect of the data symbols $d_{n2}$, $d_{n3}$, $d_{n4}$ supplied by the further data inputs D2, D3, D4. The spread code sequences C1, C2, C3, C4 in each case correspond to the selected spread code sequence $C_1$ in FIG. 2.

Through the impressing or addition of the spread code sequences C1, C2, C3, C4, each data symbol $d_{n1}$, $d_{n2}$, $d_{n3}$, $d_{n4}$ is provided, in a manner of speaking, with a "fingerprint" of its channel. The spread-coded data signals are available at the output of the spread coder SC with a signal rate of $1/T_c$—i.e. the chip rate—and an (unmodified) word width of $q_{we}$.

A channel adder CA is located in the signal path downstream of the spread coder SC. The channel adder CA includes two adders AD1, AD2 which operate at the chip rate. The adder AD1 adds the signal data originating from the data inputs D1, D3 and the adder AD2 adds the signal data originating from the data inputs D2 and D4. Data signals with a signal rate of $1/T_c$ and an (if necessary, increased) word width of $q_{ca}$ occur at both outputs of the channel adder CA.

A complex scrambler CS is used to add a base station ID to the data signals. To do this, the signals output by the channel adder CA are multiplied in the manner shown by the real or imaginary parts $s_q$ or $s_i$ of the elements of the complex-value scrambling code sequence S (corresponds to the selected code $S_k$ in FIG. 2, word width of the corresponding multiplier inputs is 1) and subsequently cross-added as shown. Furthermore, the complex scrambler CS is used to generate the I and Q signal components of the transmit signal, which are available at the output of the complex scrambler CS with a signal rate of $1/T_c$ and an, if necessary modified, word width of $q_{sc}$.

These two signal components are fed to the inputs E1, E2 of a device for spectral signal shaping ESF. The device for spectral signal shaping ESF makes the spectrally shaped (i.e. modulated) I and Q signal components available at its outputs A1, A2 with an M-fold increased signal rate. The device for spectral signal shaping ESF is described in more detail in FIG. 6 below.

A frequency correction device FK is connected downstream of the device for spectral signal shaping ESF. FIG. 3 shows a first variant of a frequency correction device FK of this type. For each signal component, this includes two multipliers M, through the use of which the real part $f_r$ and the imaginary part $f_i$ of complex elements of the frequency correction sequence F (see FIG. 2) are multiplied by the M-fold increased signal rate $M/T_c$ onto the corresponding signal component. The multiplication results obtained through multiplication of the real parts $f_r$ are then subtracted in an inverted adder AD1' and the multiplication results obtained through multiplication of the imaginary parts $f_i$ are added in an adder AD2'.

The frequency correction device FK is structurally identical to the complex scrambler CS and differs from the latter only in that the real and imaginary parts $f_r$ and $f_i$ have a word width $q_{fc}>1$ and, as already mentioned, the frequency correction is carried out with an M-fold increased signal rate. I and Q signal components, in each case with a word width of $q_{out}$ and a signal rate of $M/T_c$, occur at the output of the frequency correction device FK.

Figure 4A:
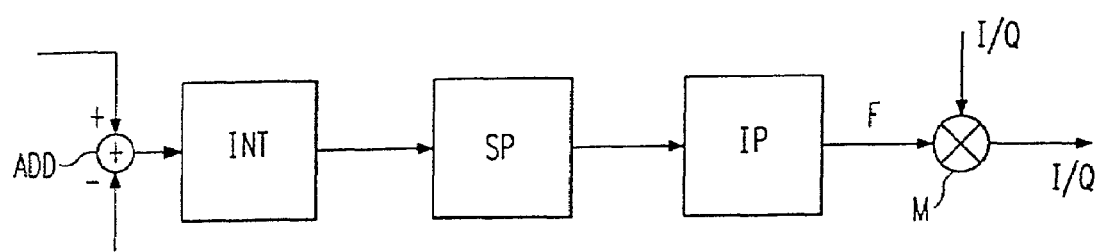
FIG. 4A is a block diagram of an exemplary embodiment of a frequency correction device according to the invention.
Figure 4B:
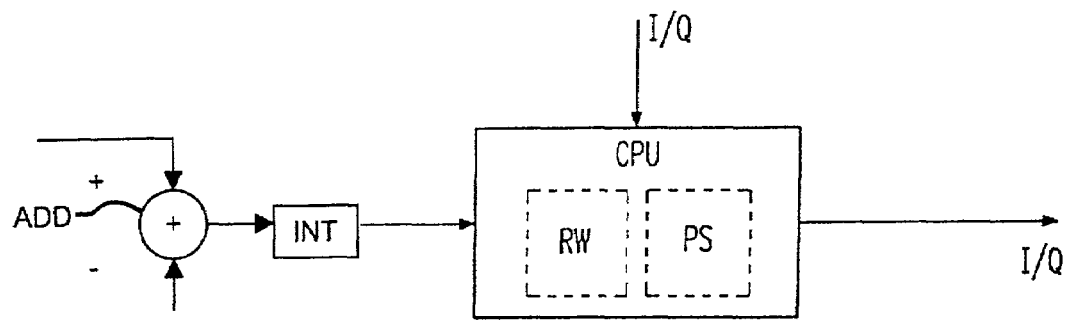
FIG. 4B is a block diagram of a further exemplary embodiment of a frequency correction device according to the invention.

FIGS. 4A and 4B serve to explain the mode of operation of the frequency correction device FK shown in FIG. 3 based on two variants.

Local oscillators, which, depending on their manufacture, may have a slightly different frequency, and which furthermore reveal temperature-dependent and pressure-dependent frequency drifts, are located in both the transmitting device SE (see FIG. 1) and in a corresponding receiving device (not shown). The transmit and receive frequencies are therefore normally different. A further cause of the occurrence of a frequency difference $\Delta f$ between the transmitting and receiving devices can be traced back to the Doppler shift in the case of transmitters and receivers which are moved in relation to one another.

Figure 5A:
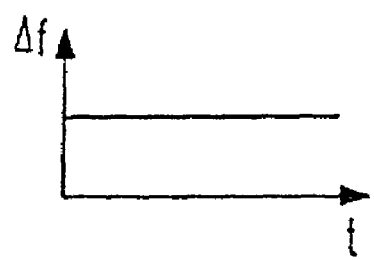
FIGS. 5A to 5C are graphs for illustrating frequency differences and phase differences at given points along the signal path in the frequency correction device of FIG. 4A.

This frequency difference $\Delta f$ is determined in an inverted adder ADD in constant repetition. It is assumed that the frequency difference $\Delta f$ is temporally constant (at least in the short term) at the output of the inverted adder ADD as shown in FIG. 5A as a diagram of the frequency difference $\Delta f$ over time t.

Figure 5B:
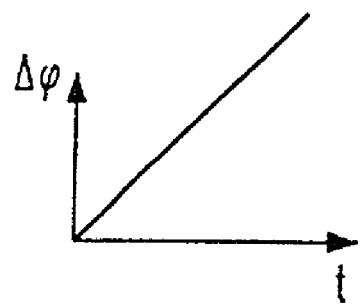
Figure 5C:
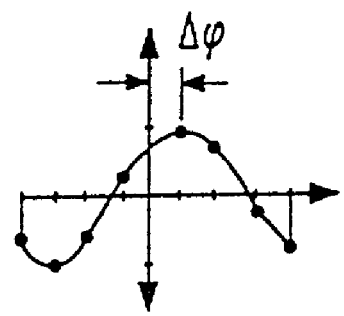

An integrator INT is connected downstream of the inverted adder ADD. The phase difference $\Delta\phi$ effected by the frequency shift $\Delta f$ is made available at the output of the integrator INT. With a temporally constant frequency difference $\Delta f$, the associated oscillation phases run linear to one another, i.e. $\Delta\phi$ increases in a linear manner with time t (see FIG. 5B).

According to a first variant, which is shown in FIG. 4A and which corresponds to the frequency correction device FK shown in FIG. 3, the frequency correction sequence F is calculated from the phase difference $\Delta\phi$. A data memory SP is connected downstream of the integrator INT for this purpose, in which a data record of sampling values of the associated (i.e. phase-shifted by $\Delta\phi$) cosine function is stored for each phase shift $\Delta\phi$. The corresponding data record (see the diagram above the output of the data memory SP) is fed to an optional interpolation filter IP. The digital interpolation filter IP generates intermediate sampling values on demand, so that the frequency correction sequence F output by the interpolation filter IP has the same signal rate $M/T_c$ as the I or Q signal component entering the frequency correction device FK.

The multiplier M connected downstream of the interpolation filter IP corresponds to one of the multipliers M of the frequency correction device FK in FIG. 3.

A second variant for generating the frequency-corrected I and Q signal components is shown in FIG. 4B. In this case, the phase difference signal $\Delta\phi$ output by the integrator INT is fed to a central processing unit CPU. The central processing unit CPU normally includes an arithmetic unit RW and a program memory PS. A calculation program for trigonometric functions based on the CORDIC (COordinate Rotation DIgital Computer) algorithm is stored in the program memory PS. The calculation program is executed by the arithmetic unit RW. The central unit CPU can be implemented as a "pipeline CORDIC processor".

The central processing unit CPU directly receives the I and Q signal components output by the signal-shaping device ESF and makes the frequency-corrected I and Q signal components available at its output. In this case, the frequency correction device FK (see FIG. 3) is replaced by the central processing unit CPU, and the firmware/hardware partitioning shown in FIG. 2 must be modified in respect of VC-S and the output-side part of MOD'. The essential advantage of the generation of the frequency-corrected I and Q signal components explained in FIG. 4A is that essentially any given frequency-correction granularity level can be achieved using a CORDIC algorithm, since the granularity of a CORDIC processor can, in principle, be made as small as required. In this context, reference is made, for example, to the publication entitled "Granularly-Pipelined CORDIC Processors for Sine and Cosine Generators" by Shaoyun Wang et al., Proceedings of the 1996 IEEE International Conference on Acoustics, Speech and Signal Processing, Atlanta, Ga., pages 3299-3302, 1996.

In contrast to this, the first variant (i.e. use of a memory SP and an interpolation filter IP) offers the advantage of lower-cost computing outlay and therefore faster data processing.

FIG. 6 shows the device for spectral signal shaping ESF in block diagrams.

The as yet unfiltered I and Q signal components are fed in each case to a shift register SR with ten memory spaces T1, T2, . . . , T10. Each memory space T1, T2, . . . , T10 stores a data word with a word width $q_{sc}$. The data words are fed through the shift register SR at the chip rate $1/T_c$.

Four taps are located in each case at each memory space T1, T2, . . . , T10 of both shift registers SR, so that each shift register SR has a total of 40 taps. The 80 taps in total of the two shift registers SR are fed to a multiplexer unit MUXE.

The multiplexer unit MUXE includes 40 multiplexers MUX1, MUX2, . . . , MUX40. Each multiplexer MUX1, MUX2, . . . , MUX40 has two multiplexer inputs. The first tap of the first memory cell T1 of the shift register SR in the I signal path leads to one multiplexer input of the first multiplexer MUX1 and the first tap of the first memory cell T1 of the shift register SR in the Q signal path leads to the second multiplexer input of the first multiplexer MUX1. Analogously, the second taps of the two shift registers SR in each case lead to the two multiplexer inputs of the second multiplexer MUX2, . . . , and the two fortieth taps of the shift registers SR lead to the two multiplexer inputs of the fortieth multiplexer MUX40.

The multiplexers MUX1, MUX2, . . . , MUX40 alternately forward the signal words originating from the I and Q signal components, buffer memories being provided in the multiplexers MUX1, MUX2, . . . , MUX40 for temporary storage of the signal words not instantaneously output at the multiplexer output.

Signal words with a word width $q_{sc}$ of the I and Q signal components with a signal rate of $2/T_c$, are (alternately) available at the forty outputs of the multiplexer unit MUXE.

The forty outputs of the multiplexer unit MUXE are fed to a filter circuit FS. The filter circuit FS includes 40 multipliers M1, M2, . . . , M40 and four adders ADD1, ADD2, ADD3 and ADD4. Each multiplier M1, M2, . . . , M40 multiplies an output signal of the multiplexer unit MUXE by a single filter coefficient $g_1, g_2, \ldots, g_{40}$. The filter coefficients $g_1, g_2, \ldots, g_{40}$ are defined by ten sampling values with 4-fold oversampling of a spectral filter function (i.e. the transmission function of the filter circuit).

The spectral filter function may, for example, be an RRC (root raised cosine) function. A filter circuit of this type is referred to as an RRC filter circuit. The RRC function is defined by the functional relationship $(1+\cos x)^{1/2}/2^{1/2}$ in the range $0 \leq x \leq \pi$, which reflects the pattern of the filter edge in the spectral range.

The adders ADD1, ADD2, ADD3, ADD4 in each case have adder inputs. The ten adder inputs of the adder ADD1 are connected to the outputs of the multipliers M1, M5, M9, M13, M17, M21, M25, M29, M33 and M37, the inputs of the adder ADD2 are connected to the outputs of the multipliers M2, M6, M10, M14, M18, M22, M26, M30, M34, M38, etc. In other words, the four adders ADD1 to ADD4 are allocated to the four taps 1 to 4 of each memory space T1, T2, . . . , T10 of the shift registers SR.

A demultiplexer unit DMUXE is connected downstream of the filter circuit FS. The demultiplexer unit DMUXE first demultiplexes each adder output in respect of the I and Q signal components and then, in each case separately for the I signal component and the Q signal component, multiplexes the results of the four adders ADD1, ADD2, ADD3, ADD4. This produces a fourfold oversampled (filtered) I signal component at the output A1 of the device for spectral signal shaping ESF and a fourfold oversampled (filtered) Q signal component at the output A2.

We claim:

1. A device for processing a digital data signal in a CDMA radio transmitter, comprising:
 a channelization device configured to impress a channel-individual CDMA code onto a digital data signal for providing a digital, channel-individualized data signal, said channelization device outputting the digital, channel-individualized data signal at a first signal rate;
 a spectral shaping device operatively connected to said channelization device, said spectral shaping device being configured to subject the digital, channel-individualized data signal to a spectral shaping for providing a digital, spectrally shaped data signal, said spectral shaping device outputting the digital, spectrally shaped data signal with a second signal rate, causing the second signal rate to be M times higher than the first signal rate, where M is an integer and $M \geq 2$, the increased second signal rate being caused by sampling each signal component of the digital, channel-individualized data signal multiple times; and a frequency correction device operatively connected to said spectral shaping device, said frequency correction device being configured to spectrally shift the digital, spectrally shaped data signal.

2. The device according to claim 1, wherein said channelization device uses a CDMA code with a variable spread factor.

3. The device according to claim 1, wherein said channelization device uses a CDMA code with a variable spread factor Q where $4 \leq Q \leq 512$.

4. The device according to claim 1, further including a complex scrambling device provided in a signal path between said channelization device and said spectral shaping device, said complex scrambling device impressing a base station ID onto the digital, channel-individualized data signal.

5. The device according to claim 1, further including a weighting device provided in a signal path upstream of said channelization device, said weighting device multiplying each of a plurality of data symbols in a data string by a weighting factor.

6. A device for processing a digital data signal in a CDMA radio transmitter, comprising:
a channelization device configured to impress a channel-individual CDMA code onto a digital data signal for providing a digital, channel-individualized data signal;
a spectral shaping device operatively connected to said channelization device, said spectral shaping device being configured to subject the digital, channel-individualized data signal to a spectral shaping for providing a digital, spectrally shaped data signal; and
a frequency correction device operatively connected to said spectral shaping device, said frequency correction device being configured to spectrally shift the digital, spectrally shaped data signal, said frequency correction device including a multiplier configured to multiply a narrowband frequency correction sequence onto the digital, spectrally shaped data signal.

7. The device of claim 6, wherein the narrowband frequency correction sequence is configured to compensate for a frequency detuning between the CDMA radio transmitter and a CDMA radio receiver.

8. A device for processing a digital data signal in a CDMA radio transmitter, comprising:
a channelization device configured to impress a channel-individual CDMA code onto a digital data signal for providing a digital, channel-individualized data signal;
a spectral shaping device operatively connected to said channelization device, said spectral shaping device being configured to subject the digital, channel-individualized data signal to a spectral shaping for providing a digital, spectrally shaped data signal; and
a frequency correction device operatively connected to said spectral shaping device, said frequency correction device being configured to spectrally shift the digital, spectrally shaped data signal, said frequency correction device including an arithmetic unit, said arithmetic unit calculating a frequency-corrected, spectrally shaped data signal from the digital, spectrally shaped data signal by running a CORDIC algorithm.

9. A device for processing a digital data signal in a CDMA radio transmitter, comprising:
a channelization device configured to impress a channel-individual CDMA code onto a digital data signal for providing a digital, channel-individualized data signal;
a spectral shaping device operatively connected to said channelization device, said spectral shaping device being configured to subject the digital, channel-individualized data signal to a spectral shaping for providing a digital, spectrally shaped data signal; and
a frequency correction device operatively connected to said spectral shaping device, said frequency correction device being configured to spectrally shift the digital, spectrally shaped data signal;
said channelization device, said spectral shaping device and said frequency correction device being configured as logical switching elements.

10. A method for processing a digital data signal in a CDMA radio transmitter, the method which comprises:
impressing a channel-individual CDMA code onto a digital data signal for providing a digital, channel-individualized data signal;
spectrally shaping the digital, channel-individualized data signal for providing a digital, spectrally shaped data signal; and
performing a frequency correction by spectrally shifting the digital, spectrally shaped data signal, the step of performing the frequency correction including performing a digital frequency correction at a clock rate being Q×M times higher than a data symbol rate of the digital data signal, where Q is a spread factor of the CDMA code used and M is an integer where $M \geq 2$.

11. A method for processing a digital data signal in a CDMA radio transmitter, the method which comprises:
impressing a channel-individual CDMA code onto a digital data signal for providing a digital, channel-individualized data signal;
spectrally shaping the digital, channel-individualized data signal for providing a digital, spectrally shaped data signal; and
performing a frequency correction by spectrally shifting the digital, spectrally shaped data signal, the step of performing the frequency correction including performing a digital frequency correction by multiplying a narrowband frequency correction sequence onto the digital, spectrally shaped data signal.

12. The method of claim 11, wherein the narrowband frequency correction sequence is configured to compensate for a frequency detuning between the CDMA radio transmitter and a CDMA radio receiver.

13. A method for processing a digital data signal in a CDMA radio transmitter, the method which comprises:
impressing a channel-individual CDMA code onto a digital data signal for providing a digital, channel-individualized data signal;
spectrally shaping the digital, channel-individualized data signal for providing a digital, spectrally shaped data signal; and
performing a frequency correction by spectrally shifting the digital, spectrally shaped data signal, the step of performing the frequency correction including performing a digital frequency correction by running a CORDIC algorithm for calculating a frequency-corrected data signal from the digital, spectrally shaped data signal.

14. A device for processing a digital data signal in a CDMA radio transmitter, comprising:
a channelization device configured to impress a channel-individual CDMA code onto a digital data signal for providing a digital, channel-individualized data signal;
a spectral shaping device operatively connected to said channelization device, said spectral shaping device being configured to subject the digital, channel-individualized data signal to a spectral shaping for providing a digital, spectrally shaped data signal; and a frequency correction device operatively connected to said spectral shaping device, said frequency correction device being configured to spectrally shift the digital, spectrally shaped data signal, said frequency correction device performing a digital frequency correction at a clock rate being Q×M times higher than a data symbol rate of the digital data signal, where Q is a spread factor of the CDMA code used and N is an integer where $M \geqq 2$.

* * * * *

UNITED STATES PATENT AND TRADEMARK OFFICE
CERTIFICATE OF CORRECTION

| | | |
|---|---|---|
| PATENT NO. | : 7,583,638 B2 | Page 1 of 1 |
| APPLICATION NO. | : 10/117806 | |
| DATED | : September 1, 2009 | |
| INVENTOR(S) | : Markus Doetsch et al. | |

It is certified that error appears in the above-identified patent and that said Letters Patent is hereby corrected as shown below:

Column 12,

Line 4, should read:

-- of the CDMA code used and M is an integer where M $\geq$ 2 --

Signed and Sealed this
Ninth Day of August, 2011

David J. Kappos
*Director of the United States Patent and Trademark Office*